3,096,116
SHOCK ABSORBING FENDER
Nick Kost, 3011 G. St., Apt. 6, Sacramento 16, Calif.
Filed May 12, 1961, Ser. No. 109,772
3 Claims. (Cl. 293—85)

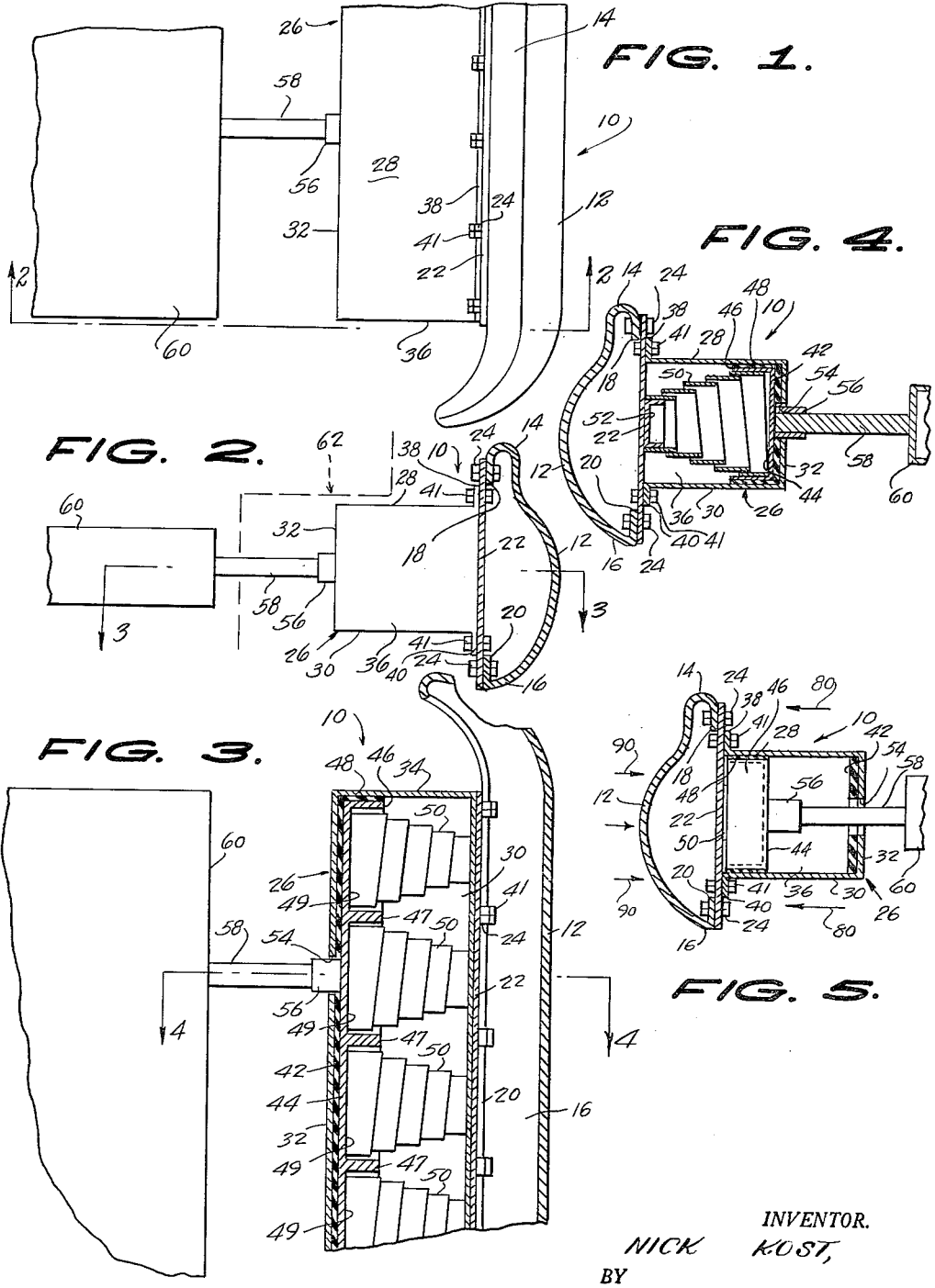

This invention relates to the general field of shock absorbing devices and, more specifically, the instant invention pertains to the provision of shock absorbing means to be mounted on vehicles.

One of the primary objects of this invention is to provide an especially designed spring cushion for the buffer of automotive vehicles, the spring cushion being so constructed and mounted as to yield readily upon slight impact of the buffer as well as to offer increasing resistance to the vehicle as a consequence of a more severe collision.

Another object of this invention is to provide a spring cushion for a vehicle buffer of the type generally referred to above, the spring cushion including a plurality of springs which will yield under light impact and which offer increasing resistance as the springs are placed under a higher degree of compression when the vehicle suffers a severe impact.

A further object of this invention provides a spring cushion for a vehicle buffer which yieldably resists collision impacts without damage thereto unless the collision impact is of an extremely severe nature.

Other and further objects and advantages of the instant invention will become more evident from a consideration of the following specification when read in the light of the annexed drawing, in which:

FIGURE 1 is a fragmentary top plan view of the spring cushion for a buffer constructed in accordance with this invention, FIGURE 1 illustrating the same as being mounted or connected to the chassis or frame of an automobile of which the same is illustrated by a fragmentary representation thereof;

FIGURE 2 is a transverse cross-sectional view, partly in side elevation and frame structure as shown in FIGURE 1, FIGURE 2 being taken substantially on the horizontal plane of line 2—2 of FIGURE 1, looking in the direction of the arrows;

FIGURE 3 is a fragmentary longitudinal cross-sectional view of the spring cushion for a buffer, FIGURE 3 illustrating the resilient means employed to permit the buffer to yield under impact, FIGURE 3 being taken substantially on the horizontal plane of line 3—3 of FIGURE 2, looking in the direction of the arrows;

FIGURE 4 is a detail cross-sectional view illustrating the relationship of the component parts of the spring cushion for a buffer under conditions of no impact, FIGURE 4 being taken substantially on the horizontal plane of line 4—4 of FIGURE 3, looking in the direction of the arrows; and FIGURE 5 is a detail cross-sectional view illustrating the associated component parts of the shock absorber and buffer under severe impact conditions.

Referring now more specifically to the drawing, reference numeral 10 designates, in general, an automotive vehicle shock absorbing fender constructed in accordance with the teachings of this invention. The buffer of the device is seen to comprise a forward curvilinear substantially hollow main body portion 12 formed of steel or other similar rigid material, the buffer 10 including top and bottom elongated ends 14, 16 which are reverted to form flanges 18, 20. The flanges 18, 20 are fixedly secured to an elongated substantially rectangular flat face plate 22 by means of bolts 24.

The face plate 22 closes the open forward end of an elongated normally horizontally extending substantially hollow rectangular housing designated, generally, by the reference numeral 26. The housing 26 comprises opposed rectangular vertically spaced, top and bottom walls 28, 30, respectively, a rectangular end wall 32 oppositely disposed with respect to the face plate 22, and a pair of oppositely disposed rectangular end walls 34, 36. The top and bottom walls 28, 30 are provided with integral substantially rectangular flanges 38, 40, respectively, which are connected to the face plate 22 by means of bolts 41.

As is seen in FIGURES 3, 4 and 5, the housing 26 includes a resilient liner 42 having an area coextensive with the area of the end wall 32 and is fixedly secured thereto by conventional means. Disposed forwardly of the liner 42 is a substantially rectangular abutment plate 44 having a continuous forwardly projecting peripheral flange 46 to the exterior side of which is fixedly connected a continuous gasket 48 which engages the top, bottom and end walls 8, 30, 34 and 36, respectively, and under certain conditions, the gasket is slidable thereon. The abutment plate 44 normally rests against the liner 42.

Referring specifically to FIGURE 3, it will be seen that the abutment plate 44 is provided with a plurality of transversely extending divider flanges 47 to define spring seats 49 to accommodate the enlarged base ends of a plurality of volute springs 50. The other or apex ends of the springs 50 are provided with closure walls 52 which constantly abut against the face plate 22. The abutment plate 44 is, thus, constantly urged towards the liner 42.

Adjacent each end of the housing 26, the end wall 32 and the resilient liner 42 are formed with coaxial transversely extending openings forming continuous passages 54 (only one being shown). Fixedly secured to the abutment plate 44 adjacent each end thereof are connector members 56 which normally project outwardly through the passages 54. As is seen in the several figures, each of the connector members 56 has one end of the rod 58 connected thereto, the other ends of the rods 58 being fixedly connected to the vehicle chassis 60 or a frame member thereof.

Reference numeral 62 which appears in FIGURE 2 of the drawing designates another forward end of a conventional automobile and is employed in this figure only to lend an environment to the spring cushion shock absorber device 26 for the buffer 12, 14, 16, 18 and 20, as described and shown.

With the shock absorber or bumper 10 installed on the vehicle 60, it is deemed that the operation thereof is self-evident. When the main body portion 12 of the bumper 10 impacts lightly against some relatively solid object disposed in the path of movement of the vehicle, the main body portion 12, the face plate 22 and the housing 26 will move slightly to the left, as viewed in FIGURE 4, the springs 50 yielding slightly upon impact. It will be understood, of course, that the severity of impact determines the amount of resistance offered by the spring 50, and in FIGURE 5 of the drawings the condition of maximum impact is illustrated.

In FIGURE 5, arrows 80 denote the direction of movement of the vehicle on which the bumper 10 is mounted, and arrows 90 designate the impact forces. Under the conditions of maximum impact, the spring 50 collapses within the lowermost one of its convolutions as the abutment plate 44 advances toward the main body portion 12 of the bumper 10, the spring 50, as illustrated in FIGURE 5, is offering the maximum amount of resistance to the impact forces 90, and it will be understood that the springs 50 are constructed to offer greater tension as the configuration of the same changes from a volute to a spiral spring.

Having described and illustrated one embodiment of this invention in detail, it will be understood that the same is offered merely by way of example, and that this invention is to be limited only by the scope of the appended claims.

What is claimed is:

1. A spring cushion shock absorber for a vehicle fender comprising a normally horizontal substantially hollow buffer member having a longitudinally-extending main body bumper portion; said shock absorber including an elongated longitudinal face plate connected to said main body bumper portion, said face plate confronting said main body bumper portion and being laterally spaced therefrom, a substantially hollow elongated longitudinal housing connected to said face plate and having an elongated longitudinal end wall spaced in confronting relation relative to said face plate, an elongated longitudinal abutment plate mounted for reciprocation within said housing and being juxtaposed with respect to said end wall, a plurality of volute springs spaced longitudinally of said face plate and said abutment plate, said springs each having their respective bases engaging against said abutment plate and their respective apices engaging against said face plate, said springs constantly biasing said face plate for movement away from said end wall, and means extending through said end wall and connected to said abutment plate for connection with said vehicle.

2. A spring cushion shock absorber for a vehicle fender comprising a normally horizontal substantially hollow buffer member having a longitudinally-extending main body bumper portion; said shock absorber including an elongated longitudinal face plate connected to said main body bumper portion, said face plate confronting said main body bumper portion and being laterally spaced therefrom, a substantially hollow elongated longitudinal housing connected to said face plate and having an elongated longitudinal end wall spaced in confronting relation relative to said face plate, an elongated longitudinal abutment plate disposed within said housing for reciprocation therein toward and away from said face plate, said abutment plate having a continuous peripheral flange, a gasket fixedly secured to and movable with said peripheral flange, said abutment plate having a plurality of divider flanges extending transversely thereacross to provide a plurality of spring seats, a plurality of volute springs disposed longitudinally of said abutment plate, said volute springs each having a base end disposed within said spring seat and each spring having a respective apex engaged against said face plate, said end wall having a plurality of openings extending transversely therethrough, a plurality of connector members secured to said abutment plate and normally projecting through said openings, and a rod for each of said connector members, said rods having one of their ends fixedly secured to said connector members and their other respective ends connectible to said vehicle.

3. A vehicle shock absorber as defined in claim 2, and a resilient liner fixedly secured to said end wall and interposed between said end wall and said abutment plate.

References Cited in the file of this patent

UNITED STATES PATENTS

| | | |
|---|---|---|
| 1,146,901 | Petitmaire | July 20, 1915 |
| 1,372,839 | Solomon | Mar. 29, 1921 |
| 1,521,579 | Freedman | Dec. 30, 1924 |
| 1,545,486 | Cotton | July 14, 1925 |
| 1,605,798 | Van Crombrugge | Nov. 2, 1926 |
| 1,618,419 | Flach | Feb. 22, 1927 |
| 1,912,840 | Havil | June 6, 1933 |
| 2,003,645 | Dalton | June 4, 1935 |
| 2,312,052 | Premo | Feb. 23, 1943 |
| 2,476,664 | Humig | July 19, 1949 |
| 2,593,586 | Maag | Apr. 22, 1952 |
| 2,715,037 | Maag | Aug. 9, 1955 |

FOREIGN PATENTS

| | | |
|---|---|---|
| 380,294 | France | Oct. 4, 1907 |